United States Patent
Cho

(10) Patent No.: US 8,103,232 B2
(45) Date of Patent: Jan. 24, 2012

(54) BROADCASTING SIGNAL RECEIVING APPARATUS AND CHANNEL SCANNING METHOD

(75) Inventor: Young Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1503 days.

(21) Appl. No.: 11/541,635

(22) Filed: Oct. 3, 2006

(65) Prior Publication Data

US 2007/0081534 A1 Apr. 12, 2007

(30) Foreign Application Priority Data

Oct. 10, 2005 (KR) .......................... 10-2005-0095143

(51) Int. Cl.
*H04B 1/18* (2006.01)

(52) U.S. Cl. .................. 455/161.1; 455/130; 455/150.1; 455/154.1; 455/160; 348/725; 348/729; 348/731

(58) Field of Classification Search .................. 455/130, 455/150.1, 154.1, 154.2, 160.1, 161.1, 178.1, 455/180.2, 188.2; 348/731–733, 725, 729, 348/735

See application file for complete search history.

(56) References Cited

U.S. PATENT DOCUMENTS

| 5,182,646 | A  | * | 1/1993 | Keenan | 348/732 |
| 5,465,402 | A | * | 11/1995 | Ono et al. | 455/161.2 |
| 2002/0175953 | A1 | * | 11/2002 | Lin | 345/811 |
| 2002/0196375 | A1 | | 12/2002 | Takagi et al. | |
| 2003/0163830 | A1 | | 8/2003 | Nam | |
| 2004/0105031 | A1 | | 6/2004 | Shibusawa | |
| 2004/0135929 | A1 | * | 7/2004 | Hoda et al. | 348/732 |
| 2004/0194135 | A1 | | 9/2004 | Kahn | |

FOREIGN PATENT DOCUMENTS

| CN | 1268844 A | 4/2004 |
| JP | 5-153510 A | 6/1993 |
| JP | 9-36707 A | 2/1997 |
| KR | 1999-019259 A | 3/1999 |
| KR | 10-2000-0045544 A | 7/2000 |

* cited by examiner

*Primary Examiner* — Tuan Pham

(74) *Attorney, Agent, or Firm* — Sughrue Mion, PLLC

(57) ABSTRACT

Provided are a broadcasting signal receiving apparatus and a channel scanning method which are capable of scanning any desirable plurality of channels quickly by providing the channel scan function using information on a plurality of multiplexer (MUX) numbers, wherein the broadcasting signal receiving apparatus, includes a tuner unit; a memory which stores information related to a plurality of MUX numbers intended to be scanned; and a control unit which performs a channel scan by providing the information related to the MUX numbers stored in the memory to the tuner unit consecutively in accordance with an input of a prescribed scan instruction.

15 Claims, 3 Drawing Sheets

BROADCASTING SIGNAL RECEIVING APPARATUS AND CHANNEL SCANNING METHOD

CROSS-REFERENCE TO RELATED APPLICATIONS

This application claims priority from Korean Patent Application No. 10-2005-0095143, filed on Oct. 10, 2005, in the Korean Intellectual Property Office, the disclosure of which is incorporated herein by reference.

BACKGROUND OF THE INVENTION

1. Field of Invention

Apparatuses and methods consistent with the present invention relate to broadcasting signal receiving and channel scanning, and more particularly, to a broadcasting signal receiving apparatus and a channel scanning method for scanning channels that a user wants.

2. Description of the Related Art

A digital broadcast is used to transmit several broadcast programs per channel using compression technology with high channel utilization unlike an analog broadcast.

For example, in a case of using a modulation such as 64 Quadrature Amplitude Modulation (QAM), 256 QAM and the like, it is possible to transmit at most several tens of programs through one physical channel. Virtual channel numbers of a type which couple two numbers using a dash "-" are used to discriminate among a plurality of programs provided from several channels or each channel. For example, when the virtual channel numbers are 11-1, 11-2, 11-3, 11-4, . . . , a number ahead of "-", that is, "11" indicates a major channel, and a number behind the "-" indicates a minor channel.

The major channel represents the physical channel band into which the program can be transmitted while discriminating a broadcasting program provider. The minor channel represents a signal vector region to which the program can be provided via the channel while discriminating the plurality of programs to be provided via the identical channel.

Herein, the original channel number is associated with the frequency band of the physical channel. However, digital TVs use the major channel number such as the analog channel number, regardless of the frequency band sequence of the physical channel, for the convenience of viewers accustomed with the channel number in a conventional analog broadcast. Therefore, the physical channel number generally is not identical to the major channel number. Herein, the physical channel number generally means a multiplexer (MUX) number.

Meanwhile, the digital TV generally has an automatic channel scan function. Herein, the automatic channel scan function sets the channels by scanning from the beginning to the end of the frequency range available for the TV. With such functionality, the user can seek and set all channels by performing the channel scan automatically even if the user does not know the frequency of the channel.

However, for the digital TV which can provide a plurality of services in one physical channel, it takes a lot of time to perform the automatic channel scan.

Consequently, in a case that the user knows the MUX number of the channel or the channel frequency already, the automatic channel scan function can cause unnecessary scanning over the full frequency range.

For the purpose of addressing this problem, a TV has been introduced that is capable of manually scanning the channel. However, in this related art TV, the user has to scan the frequencies one at a time, even if the user knows the frequency already.

SUMMARY OF THE INVENTION

Accordingly, an aspect of the present invention provides a broadcasting signal receiving apparatus and a channel scanning method which are capable of scanning any desirable plurality of channels quickly by providing the channel scan function using information on a plurality of MUX numbers.

The foregoing and/or other aspects of the present invention can be achieved by providing a broadcasting signal receiving apparatus, comprising a tuner unit; a memory for storing information related to a plurality of MUX numbers intended to be scanned; and a control unit for performing a channel scan by providing the information related to the MUX numbers stored in the memory to the tuner unit consecutively in accordance with an input of a prescribed scan instruction.

According to an aspect of the present invention, the broadcasting signal receiving apparatus further comprises a user interface (UI) unit which receives the information related to the plurality of MUX numbers to be scanned, wherein the control unit causes the memory to store the information related to the plurality of MUX numbers inputted via the UI unit.

According to an aspect of the present invention, the UI unit comprises a UI generating unit which generates a UI menu for inputting the plurality of MUX numbers to be scanned and a channel frequency corresponding to a MUX number of the plurality of MUX numbers.

According to an aspect of the present invention, the UI unit further comprises a user input unit to which the MUX number and the channel frequency are inputted from a user; if one of the MUX number and the channel frequency is inputted from the user input unit, the control unit sets the other in correspondence with the one of the MUX number and the channel frequency.

According to an aspect of the present invention, the UI menu further comprises an item for inputting a frequency band.

The foregoing and/or other aspects of the present invention can be achieved by providing a channel scanning method comprising inputting information related to the plurality of MUX numbers to be scanned from a user; setting the information related to the plurality of MUX numbers as a list to be scanned; inputting a channel scan instruction; and performing the channel scan consecutively in accordance with the information on the MUX numbers of the list to be scanned.

According to an aspect of the present invention, the inputting of the information related to a plurality of MUX numbers from a user comprises inputting one of a MUX number of the plurality of MUX numbers to be scanned and the channel frequency corresponding to the MUX number.

According to an aspect of the present invention, the inputting of the information related to the plurality of MUX numbers from a user comprises generating a UI menu for inputting the MUX number and the channel frequency corresponding to the MUX number.

According to an aspect of the present invention, the UI menu further comprises an item for inputting a frequency band.

According to an aspect of the present invention, the inputting information related to the plurality of MUX numbers from a user comprises setting the other in correspondence with the one of the MUX number and the channel frequency.

According to another aspect of the present invention, there is provided a computer readable recording medium having embodied thereon a computer program for executing a channel scanning method, the method comprising inputting information related to a plurality of MUX numbers to be scanned; setting the information related to the plurality of MUX numbers as a list to be scanned; inputting a channel scan instruction; and performing the channel scan consecutively in accordance with the information on the MUX numbers of the list to be scanned.

BRIEF DESCRIPTION OF THE DRAWINGS

The above and/or other aspects of the prevent invention will become apparent and more readily appreciated from the following description of the exemplary embodiments, taken in conjunction with the accompany drawings, in which.

Figure 1:
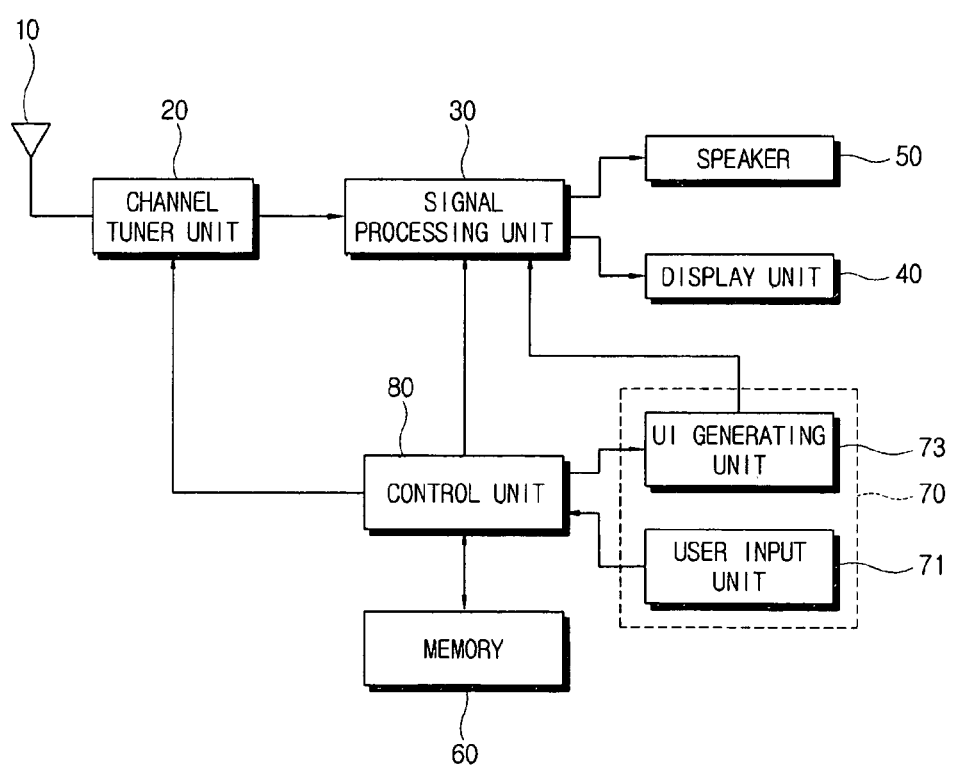
FIG. 1 illustrates a control block diagram of a digital TV according to an exemplary embodiment of the present invention.

DETAILED DESCRIPTION OF THE ILLUSTRATIVE, NON-LIMITING EMBODIMENTS OF THE INVENTION

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

As shown in FIG. 1, a digital TV as a broadcasting signal receiving apparatus has an antenna 10, a channel tuner unit 20, a signal processing unit 30, a display unit 40, a speaker 50, a memory 60, a UI unit 70, and a control unit 80.

The channel tuner unit 20 can be implemented by one or a plurality of tuners which tunes the broadcasting signal inputted from the antenna 10, a demodulator which demodulates the tuned signal, a decoder, a MUX and the like, and tunes the broadcasting signal having a frequency band corresponding to a tuning control signal of a control unit to be described later. In a case of the digital broadcasting signal, the demodulator outputs the received broadcasting signal in a form of transport stream through a Vestigial Sideband Modulation (VSB) demodulating procedure, an error correction procedure and the like. At this time, the tuner may include both the analog tuner and the digital tuner so that it may receive both an analog broadcasting signal and a digital broadcasting signal, or multi tuner which is capable of receiving both of them can be used instead.

The tuned digital broadcasting signal on the channel is subject to processing in the signal processing unit 30 and then is displayed in the display unit 40. Herein, the signal processing unit 30 may include various functions in correspondence with a format of an image signal inputted. For example, they can include an A/D converting function for converting input digital image signals of various formats into a digital image signal of a certain format, a digital decoding function, a scaling function for controlling vertical frequency, resolution, screen ratio, and the like, cause the digital image signal and/or the analog image signal inputted to conform to an output standard for the display unit, and prescribed format converting function.

Herein, the display unit 40 can be applied to various types of display modules such as Cathode Ray Tube (CRT), Digital Light Processing (DLP), Liquid Crystal Display (LCD), Plasma Display Panel (PDP) and the like.

Stored in the memory 60 are information related to a plurality of MUX numbers intended to be scanned and channel data relating to the channel scanned by the control unit (described later). The channel data stored in the memory 60 is referenced upon tuning the channel selected by the user.

The memory 60 stores the frequency information relating to each channel. The frequency information can include a center frequency and frequency band of each channel. The memory 60 can also store a channel list to be scanned which is set by the control unit 80.

The UI unit 70 includes a UI generating unit 73 which generates a UI menu for inputting information related to a plurality of MUX numbers, i.e., MUX number, channel frequency, and frequency band, and a user input 71 unit for generating the input control signal according to user's operations.

The UI generating unit 73 can be implemented by an on-screen display (OSD) generator. The user input unit 71 can generally be implemented by a remote controller in which buttons for activating the channel scan function, channel up/down keys, number buttons and the like are prepared, a front control panel of the display device, a controller for processing signals received from them, and the like. Particularly, the user input unit 71 may allow users to perform channel operations more conveniently by using hot keys, voice recognition means and the like.

It will be described on screen of the UI menu generated by the UI unit 70 referring to FIG. 2.

Figure 2:
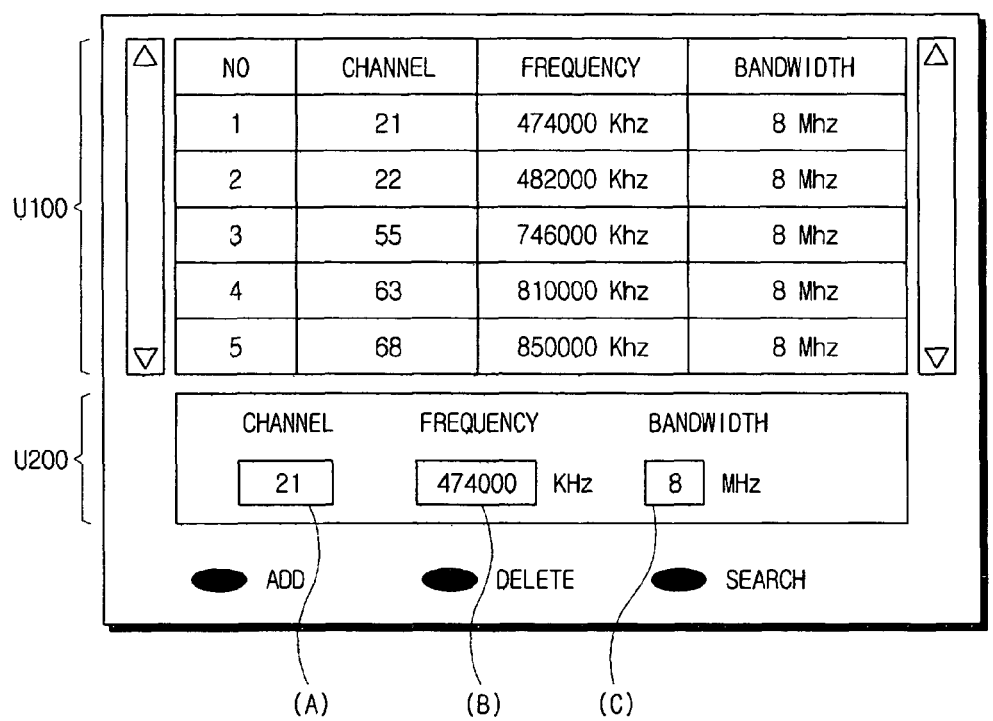
FIG. 2 illustrates a UI menu screen formed by a UI unit of FIG. 1.

As shown in FIG. 2, a portion U100 displays a channel list to be scanned which is inputted by the user input unit 71, and the user can view the corresponding list using scroll bars. Portion U200 of the UI menu displays three input windows capable of inputting the MUX number (A), the channel frequency (B) corresponding to the MUX number, and the frequency band (C). The frequency band is generally selected among 6, 7, and 8 MHz The user can input desirable information into the corresponding input windows respectively by means of the user input unit 71. Here, the MUX number (A) means the physical channel number, and a plurality of the physical channels can be set to be scanned.

Further, it is possible to add/delete the physical channel corresponding to the MUX number displayed in the input windows to/from the scan list by selecting items "ADD" and "DELETE" at the bottom portion of the UI menu, and to scan the scan list in the portion U100 by selecting an item "SEARCH".

The control unit 80 according to an exemplary embodiment of the present invention can be implemented by a processor or a controller such as Central Processing Unit (CPU), Micro Controller Unit (MCU), and the like. The control unit 80 applies the tuning control signal to the channel tuner unit 20 so that it may tune the corresponding frequency consecutively in correspondence with the MUX number or the channel frequency inputted by the user, and forms the channel list by detecting whether there are available channels based on the results processed by the signal processing unit 30.

The control unit 80 controls the UI generating unit 73 to generate the above-mentioned UI menu and causes the memory 60 to store the information of the MUX number, the channel frequency and the frequency band inputted via the user input unit 71 upon the UI menu, if the user selects a function for inputting the channel to be scanned via the user input unit 71, and the control unit 80 performs the channel scan based on the information stored in the memory 60 if the user selects the channel scan function.

If the user inputs one of the MUX number and the channel frequency, the control unit 80 can set the other automatically. For example, if the user inputs number 21 at the window (A) for inputting the MUX number in FIG. 2, the window (B) for inputting channel frequency is allowed to display 474000 KHz corresponding to the physical channel number 21 automatically. Thereby, it is possible to provide the channel scan function even if the user only knows one of the MUX number and the channel frequency.

As described earlier, the MUX number input by the user corresponds to the number of the physical channel, wherein a plurality of services can be provided via one physical channel. Therefore, the control unit 80 forms the plurality of services contained in the physical channel as the channel list, by scanning the channels in correspondence with the MUX number or the channel frequency input by the user.

For example, if the user designates the MUX numbers of the number 11 and the number 25 as being scanned, the control unit 80 applies the tuning control signal to the channel tuner unit 20 to tune the corresponding channels consecutively. The control unit 80 then forms the channel list containing a total of 16 services, if the number 11 contains ten services and the number 25 contains six services, as a result of detecting the broadcasting signal contained in the physical channels of the number 11 and 25, parsed respectively by the signal processing unit 30. Herein, each service can be recognized by channel to the user.

More specifically, it is possible to detect whether there is the corresponding channel by parsing a header of a packet after demodulating the digital broadcasting signal received and converting it into the data stream. In other words, since the packet header within the broadcasting signal has a packet identifier (PID), it is possible to recognize whether available broadcasting signal is inputted by parsing the header.

Subsequently, the digital TV according to an exemplary embodiment of the present invention can scan the plurality of channels using the MUX number or the channel frequency corresponding to the physical channel which the user wants to scan.

Figure 3:
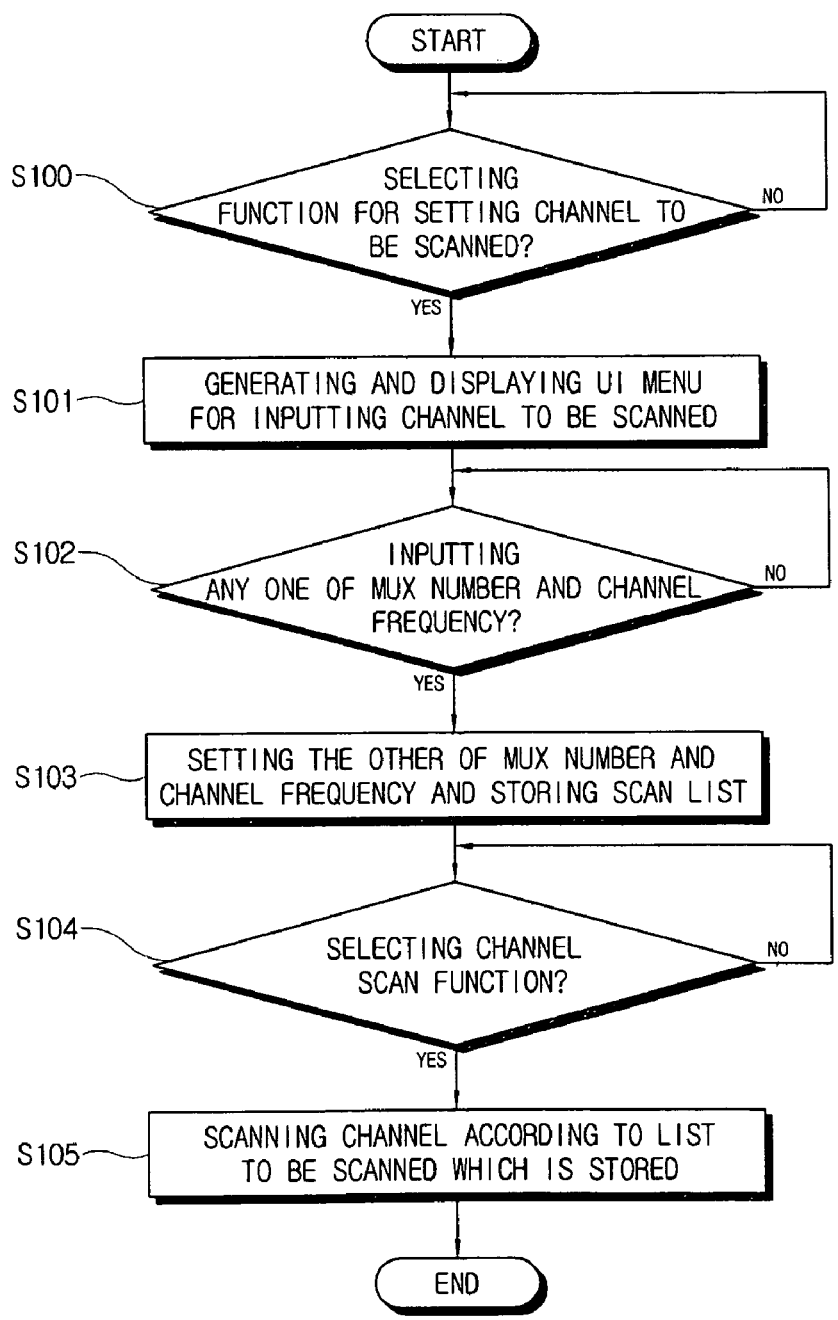
FIG. 3 illustrates a control flow chart of a digital TV of FIG. 1.

A channel scanning method of the digital TV according to an exemplary embodiment of the present invention will be now described referring to FIG. 3.

As shown in FIG. 3, if the user selects a function for setting the channel to be scanned via the user input unit 71 (S100), the control unit 80 controls the UI generating unit 73 to generate the UI menu for inputting the plurality of channels to be scanned, and the UI menu generated is combined with the broadcasting signal which is now processed at the signal processing unit 30 to be displayed in the display unit 400 (S101).

If the user inputs any one of the MUX number and the channel frequency upon the UI menu displayed on the screen via the user input unit 71 (S102), the control unit 80 controls the other of the MUX number and the channel frequency to be displayed on the screen automatically (S103). Further, the information on the MUX number inputted by the user, i.e., the MUX number and the channel frequency are stored in the memory 60 as the scan list (S103).

If the channel scan function is selected via the user input unit 71 (S104), it is possible to scan the channel frequency corresponding to the plurality of MUX numbers inputted by the user in accordance with the list to be scanned which is stored in the memory 60 (S105).

Consequently, the user is allowed to quickly scan only plurality of channels which he wants to scan, by providing the UI which is capable of setting the MUX number or channel frequency to be scanned.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A broadcasting signal receiving apparatus, the apparatus comprising:
   a tuner unit;
   a memory which stores information related to a plurality of physical channel numbers intended to be scanned;
   a control unit which performs a channel scan by providing the information related to the physical channel numbers stored in the memory to the tuner unit consecutively in accordance with an input of a prescribed scan instruction, and
   a user interface (UI) unit which receives the information related to the plurality of physical channel numbers to be scanned,
   wherein the UI unit further comprises a user input unit to which the information related to the plurality of physical channel numbers to be scanned is input by a user, wherein the information related to the plurality of physical channel numbers to be scanned comprises at least one of the physical channel number and the channel frequency, and wherein if the at least one of the physical channel number and the channel frequency is input from the user input unit, the control unit sets the other of the physical channel number and the channel frequency in correspondence with the one of the physical channel number and the channel frequency input, and
   wherein a plurality of services are provided via one physical channel, and the plurality of services contained in the physical channel are formed as the channel list.

2. The broadcasting signal receiving apparatus of claim 1, wherein the control unit causes the memory to store the information related to the plurality of physical channel numbers.

3. The broadcasting signal receiving apparatus of claim 2, wherein the UI unit comprises a UI generating unit which generates a UI menu for inputting the plurality of physical channel numbers to be scanned and a channel frequency corresponding to a physical channel number of the plurality of physical channel numbers.

4. The broadcasting signal receiving apparatus of claim 3, wherein the control unit automatically sets the other of the physical channel number and the channel frequency in correspondence with the one of the physical channel number and the channel frequency input.

5. The broadcasting signal receiving apparatus of claim 3, wherein the UI menu further comprises an item for inputting a frequency band.

6. A channel scanning method comprising:
   inputting information related to a plurality of physical channel numbers to be scanned;
   setting the information related to the plurality of physical channel numbers as a list to be scanned;
   inputting a channel scan instruction; and
   performing the channel scan consecutively in accordance with the information on the physical channel numbers of the list to be scanned,
   wherein the inputting of the information related to the plurality of physical channel numbers comprises inputting one of a physical channel number of the plurality of physical channel numbers to be scanned and a channel frequency corresponding to the physical channel number, and automatically setting the other of the physical channel number and the channel frequency in correspondance with the one of the physical channel number and the channel frequency, wherein a plurality of services are provided via one physical channel, and the plurality of services contained in the physical channel are formed as the channel list.

7. The channel scanning method of claim 6 wherein the inputting the information related to a plurality of physical channel numbers comprises generating a UI menu for inputting the physical channel number and the channel frequency corresponding to the physical channel number.

8. The channel scanning method of claim 6, wherein the UI menu further comprises an item for inputting a frequency band.

9. The channel scanning method of claim 6, wherein the inputting of information related to the plurality of physical channel numbers comprises setting the other of the physical channel number and the channel frequency in correspondence with the one of the physical channel number and the channel frequency.

10. The channel scanning method of claim 7, wherein the inputting information related to the plurality of physical channel numbers comprises setting the other of the physical channel number and the channel frequency in correspondence with the one of the physical channel number and the channel frequency.

11. A non-transitory computer-readable recording medium having embodied thereon computer executable instructions for executing a channel scanning method, the method comprising:

inputting information related to a plurality of physical channel numbers to be scanned;

setting the information related to the plurality of physical channel numbers as a list to be scanned;

inputting a channel scan instruction; and performing the channel scan consecutively in accordance with the information on the physical channel numbers of the list to be scanned, wherein the inputting of the information related to the plurality of physical channel numbers comprises inputting one of a physical channel number of the plurality of physical channel numbers to be scanned and a channel frequency corresponding to the physical channel number, and automatically setting the other of the physical channel number and the channel frequency in correspondance with the one of the physical channel number and the channel frequency, wherein a plurality of services are provided via one physical channel, and the plurality of services contained in the physical channel are formed as the channel list.

12. The broadcasting signal receiving apparatus of claim 1, wherein the physical channel number is a multiplexer number.

13. The broadcasting signal receiving apparatus of claim 1, wherein the physical channel numbers are associated with a frequency band.

14. A broadcasting signal receiving apparatus, the apparatus comprising:

a tuner unit;

a memory which stores information related to a plurality of physical channel numbers intended to be scanned;

a control unit which performs a channel scan by providing the information related to the physical channel numbers stored in the memory to the tuner unit consecutively in accordance with an input of a prescribed scan instructions, and a user interface (UI) unit receives the information related to the plurality of physical channel numbers to be scanned, wherein the UI unit further comprises a user input unit to which the information related to the plurality of physical channel numbers to be scanned is input by a user, and wherein a plurality of services are provided via one physical channel, the channel scan is performed on at least one of a plurality of physical channels corresponding to the information input by a user, and at least a part of the plurality of services contained in the at least one physical channel, which can be currently received, are formed as a channel list.

15. A channel scanning method comprising:

inputting information related to a plurality of physical channel numbers to be scanned;

setting the information related to the plurality of physical channel numbers as a list to be scanned;

inputting a channel scan instruction; and performing the channel scan consecutively in accordance with the information on the physical channel numbers of the list to be scanned, wherein a plurality of services are provided via one physical channel, the channel scan is performed on at least one of a plurality of physical channels corresponding to the information input by a user, and at least a part of the plurality of services contained in the at least one physical channel, which can be currently received, are formed as a channel list.

* * * * *